United States Patent [19]

Schlosser

[11] 3,818,331

[45] June 18, 1974

[54] TESTING AND MEASURING SYSTEM FOR DETERMINING THE CHARACTERISTICS OF A NETWORK OVER A VARIABLE FREQUENCY RANGE

[75] Inventor: Karl Schlosser, Planegg, Germany

[73] Assignee: Siemens AG, Berlin and Munich, Germany

[22] Filed: Mar. 8, 1973

[21] Appl. No.: 339,080

[30] Foreign Application Priority Data
Mar. 22, 1972 Germany............................ 2213996

[52] U.S. Cl.............................................. 324/57 R
[51] Int. Cl............................................ G01r 27/00
[58] Field of Search ................................. 324/57 R

[56] References Cited
UNITED STATES PATENTS

| 1,684,403 | 9/1928 | Mason........................... | 324/57 R X |
| 2,047,782 | 7/1936 | Jensen........................... | 324/57 R X |
| 2,580,803 | 1/1952 | Logan ........................... | 324/57 R X |
| 2,622,127 | 12/1952 | Alsberg et al..................... | 324/57 R |
| 2,685,063 | 7/1954 | Alsberg......................... | 324/57 R X |
| 2,760,155 | 8/1956 | Kelly............................ | 324/57 R |
| 2,970,258 | 1/1961 | Sinclair......................... | 324/57 R |
| 3,379,975 | 4/1968 | Niedereder.................... | 324/57 R X |

Primary Examiner—Stanley T. Krawczewicz
Attorney, Agent, or Firm—Hill, Gross, Simpson, Van Santen, Steadman, Chiara & Simpson

[57] ABSTRACT

A testing and measuring system for determining the attenuation characteristics of a network, wherein a pair of parallel paths are provided to which a variable frequency transmitter is connected and with the network or component to be tested mounted in one of the parallel branches. Modulators are mounted in each of the parallel branches so as to frequency shift the signals in the parallel branches to different frequencies, after which the parallel branches are connected together and pass through a frequency converter to provide an I. F. output at a test receiver. A variable gain control amplifier receives the output I. F. signals and a pair of band pass filters have their inputs connected to the output of the control amplifier and are tuned to respectively pass one of the side band frequencies of the modulator in the branch with the test object converted to the I. F. range, and one of the side band frequencies of the modulator in the parallel branch which did not include the test object converted to the I. F. range. A detector is connected to the output of the band pass filter which passes the signal which does not pass through the test object and supplies an input to a differential amplifier which receives a second input from a reference oscillator and the output of the differential amplifier is connected to the variable gain control of the control amplifier. This signal may also be supplied to the transmitter oscillator to control its amplitude level. The band pass filter which passes the signal that did not pass through the test object has an output which is supplied to a modulator which receives an injection frequency and which converts its frequency to the same as that of the band pass filter which passed the signal from the test object. The output of this modulator is supplied to the evaluation system for additionally determining the phase shift characteristics of the test object or its transmission properties including phase shift.

9 Claims, 1 Drawing Figure

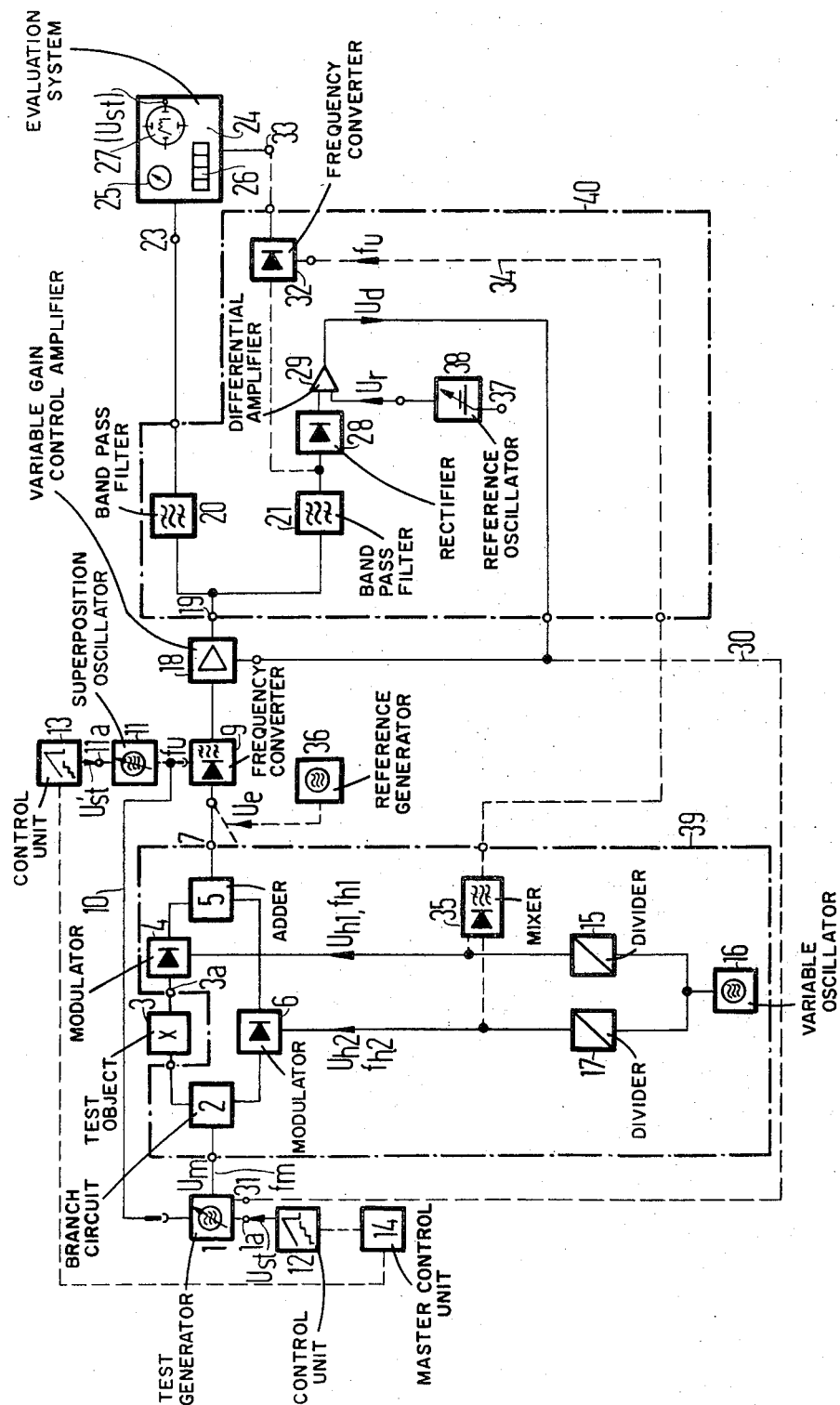

TESTING AND MEASURING SYSTEM FOR DETERMINING THE CHARACTERISTICS OF A NETWORK OVER A VARIABLE FREQUENCY RANGE

BACKGROUND OF THE INVENTION

1. Field of the Invention

This invention relates in general to frequency selective measuring circuits, in particular suited for frequency modulated operation, wherein a transmitter and receiver are connected to a test object to determine its characteristics.

2. Prior Art

The magazine N.T.Z. published in 1969, Volume 4, page 237, illustrates in FIG. 3 an automatic calibration system for a test system. In the system described in this article, the voltage which is to be measured is alternately supplied to the level meter of the receiver along with a calibration voltage, which allows automatic calibration of the level meter with the use of a Servo system. However, there are disadvantages to alternately switching the signal which is passed through the test object from the evaluation system and applying a calibrating signal because as the frequency of the applied test signal is varied at a fairly high rate, the rate of switching the evaluation system is related to the frequency variations, which can render this system impractical.

SUMMARY OF THE INVENTION

The present invention provides a test and measuring system, where in a test object is mounted in one of two parallel branches which have similar characteristics and the output of a variable frequency test oscillator is applied to both parallel branches. The parallel branches each contain modulators which receive different injection frequencies, so as to convert the signals in the parallel branches to different frequencies. An adder then combines the two parallel branches behind the modulator and passes the signal to a frequency converter which receives an input frequency from a local oscillator or the test oscillator so as to convert the signals to intermediate frequencies. A variable gain control amplifier receives the output of the frequency converter and applies its output to a pair of band pass filters. The first band pass filter has a pass band so as to pass one of the side band frequencies of the modulator in the branch with the test object converted to the I. F. range and the output of this band pass filter is supplied to an evaluation system. The second band pass filter is tuned to pass one of the side band frequencies of the modulator in the branch without the test object converted to the I. F. range, and supplies an input to a detector. A different amplifier receives the output of the detector and an input from a reference oscillator and produces an output signal which is connected to the variable gain control of the control amplifier so as to control the amplitude of its output. The output of the differential amplifier may be also alternatively applied back to the test generator to control its amplitude level. Also a modulator may be connected after the second band pass filter which passes the signal which passed the parallel branch not containing the test object to convert the frequency of this signal to the same as that which passed the first band pass filter and applying this output to the evaluation device.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure, and in which:

BRIEF DESCRIPTION OF THE DRAWING

The drawing is a block diagram of the novel testing system of the invention.

DESCRIPTION OF THE PREFERRED EMBODIMENTS

The present invention assures that the measured results will be free from intrinsic faults of the measuring circuit itself even during relatively fast changes of the measuring frequencies. The present invention quickly compensates intrinsic faults much faster than those of prior art arrangements. German Pat. No. 1,104,562 discloses a circuit arrangement for measuring the cross-talk properties of long distance lines, whereby the output voltage of the feeding line and those of the influenced line are supplied to the input of a control circuit. Reverse feedback is utilized to maintain the voltage of the feeding line constant. The output voltage of the influenced line after passing through the control amplifier is furnished to an evaluation system together with the adjusted output voltage of the feeding line, and there an amplitude and phase comparison is accomplished, so as to obtain a vector diagram representation of complex cross-talk and intermodulation factors. In the present invention as shown in the figure, test transmitting generator 1 supplies a frequency modulated output test signal $U_m$ of a variable frequency $f_m$ to a branch circuit 2. The branch circuit 2 has a pair of outputs, one of which is supplied to the test object 3 which has an output terminal 3a. A modulator or mixer 4 has its input connected to output terminal 3a and supplies an output to an adder stage 5. The branch circuit 2 also supplies an input to a modulator or mixer 6 which supplies its output to the adder circuit 5. A variable oscillator 16 supplies inputs to a pair of frequency dividers 15 and 17 which have different dividing factors. The divider 15 supplies an auxiliary voltage $U_{h1}$ at a frequency of $f_{h1}$ to the modulator 4 and the divider 17 supplies an auxiliary frequency $U_{h2}$ at a frequency $f_{h2}$ to the modulator 6. The frequencies fm plus or minus $f_{h1}$ and fm plus or minus $f_{h2}$ produced in the modulators 4 and 6, respectively, are all in the pass band of a frequency converter 9 which receives the output of the adder 5. The frequency converter 9 contains a modulator which receives a superposition frequency fu which is shifted a fixed amount with respect to the measuring frequency fm. The superposition frequency fu supplied to the frequency converter 9 is supplied either from the test generator 1 via connection line 10, or alternatively may be supplied from a superposition oscillator 11. The transmission generator 1 has a frequency control terminal 1a which receives a control voltage $U_{st}$ at its input terminal 1a from a control unit 12. The superposition oscillator 11 has a frequency control terminal 11a which may receive a control signal $U_{s,t}$ from a control unit 13. A master control unit 14 may be connected to the control units 12 or 13.

A variable gain control amplifier 18 receives the output of the frequency converter 9 and supplies an output intermediate frequency to terminal 19. The first band pass filter 20 has its input connected to terminal 19 and has a pass band such that the band pass filter 20 passes one of the side band frequencies of the modulator 6 which passes through the test object 3 and is subsequently converted to an I. F. range. The band pass filter 21 has a pass band such that it passes one of the side band frequencies of the modulator 6 converted to an I. F. range and does not pass the signals which pass through the test object 3 and the modulator 4. An evaluation system 24 has an input terminal 23 which is connected to the output of the band pass filter 20. The evaluation system 24 may be constructed in a known manner and may indicate the attenuation of the test object 3 with an indicator meter 25. A digital indicator 26 may also be incorporated in the evaluation system 24. A cathode ray oscilloscope 27 is incorporated in the evaluation system 24 and may receive the control voltage $U_{st}$ from the transmission generator control 12 as a deflection voltage. Alternatively, a deflection signal may be derived from the measuring voltage $U_m$. The evaluation system may incorporate several or all of the indications simultaneously.

The output of the band pass filter 21 is supplied to a rectifier 28 which supplies an output to a differential amplifier 29, which also receives a reference voltage signal $U_r$ from a reference oscillator 38. The differential amplifier 29 produces a gain control signal $U_d$ which is supplied to the gain control terminal of the control amplifier 18. The output of the voltage $U_d$ of the differential amplifier 29 may alternatively be supplied by lead 30 to the transmission generator 1 which has an amplitude control input terminal 31. The evaluation system 24 may have a reference voltage to which the input signal at the terminal 23 is compared and the feedback system including the differential amplifier 29 and the feedback signal $U_d$ supplied to the amplifier 18 provides calibration and control such that the evaluation system 24 will produce accurate measurements of attenuation and phase characteristics of the test object 3.

Alternatively, the output of the band pass filter 21 may be supplied to a modulator or frequency converter 32, which receives an input signal $f_u$ from the line 34 from a mixer 35 which receives input signals $f_{h1}$ and $f_{h2}$ from the dividers 15 and 17. The output of the mixer 32 will be at the same frequency as the output of the band pass filter 20 and is supplied to an input terminal 33 of the evaluation system 24, wherein it is compared with the signal applied to input terminal 23.

Such evaluation may be made in a common manner. For example, these voltages may be compared with the aid of two phase bridges which divide the signal into two voltage components which respectively represent the real and imaginary parts of the tramsmission factor of the test object 3. If the real and imaginary components are separately supplied to the vertical deflection system of the cathode ray oscilloscope 27, and the horizontal deflection system is controlled in a frequency dependent manner, the frequency trace of the real or imaginary characteristic of the transmission factor will be presented. On the other hand, if the real and imaginary voltage components are supplied to the horizontal and vertical deflection systems of the device 27 respectively, the image of the vector diagram of the transmission factor will result. This vector diagram indicates one point in a coordinate system for each value of $f_m$ respectively, the abscissa of which is proportional to the real part of the transmission factor, while its ordinate is proportional to the imaginary part. It is also possible to supply the voltages obtained at terminals 23 and 33 to a phase meter to measure the phase shift of the test object 3, and the output could be supplied to the analogue indicator 25, the digital indicator 26, or the cathode ray oscilloscope 27 for a frequency dependent phase shift curve representation. Furthermore, any remaining control system errors caused by the feedback control loop through the rectifier 28, the differential amplifier 29, the band pass filter 21, the variable gain control amplifier 18 or the reference oscillator 38 can be eliminated to allow exact attenuation measurements by joint evaluation of the signals obtained at terminals 23 and 33 in the form of a measurement of the difference of these two signals.

According to a further development of the invention, an absolute calibration of the receiving part of the measuring system including the circuit components behind the intermediate frequency terminal 19 can be carried out. This can be accomplished by providing a switch which disconnects the input of the frequency converter 9 from the output terminal 7 of the adding circuit 5 and connects it to the output of a calibration generator 36 which supplies an input signal $U_e$ to the frequency converter 9. The voltage level obtained at the evaluation system 24, as for example, at the indicator 25, can then be compared in a prior art known manner with the associated desired value, and any possible deviation from the desired value may be noted and be compensated for by changing the amplitude of the reference oscillator 38. Thus, the amplitude of the reference oscillator 38 may be adjusted for calibrating purposes with the frequency converter 9 receiving the reference voltage from the reference generator 36. The reference oscillator output may be adjusted by the control 37, which may be a voltage control electronic element or alternatively a control knob that can be manually set. After the reference oscillator 38 is calibrated the switch is disconnected from the reference oscillator 36 and the input to the frequency converter 9 is again connected to the output terminal 7 of the adder 5.

In a preferred embodiment of the invention the various components may be, for example, packaged in a unit 39 which includes the branch circuit 2, the modulators 4 and 5, as well as the adder 5 and the related frequency dividers for producing the injection frequencies for the modulators 4 and 6, as well as the unit 35. A second unit of the invention may include the band pass filters 20 and 21, the detector 28, differential amplifier 29, the reference oscillator 38, as well as the modulator 32. The two units may of course be mounted in a larger common unit, if desired.

Depending on the manner in which the superposition frequency $f_u$ is produced and the measuring frequency fm is varied, determines the various operational states of the described attenuation measuring device. For example, if the frequency $f_u$ is obtained via the connection line 10 from the transmitter oscillator 1, synchronized operation is being carried out. On the other hand, if the frequency $f_u$ is obtained from the oscillator 11 a nonsynchronized operation will occur. Also the frequency variation fm can be accomplished by hand tuning or with an electronic automatic frequency control with the help of the frequency control voltage $U_{st}$ which is produced by the control voltage unit 12. For example, saw tooth or triangular-shaped voltage waves, as well as staircase voltages can be used to produce desired measuring frequencies for automatic control operation. The control 14 supplies an input to the control 12 so that its output voltage is either triangular, saw tooth, or staircase as desired.

For non-synchronized operation the control 14 may control the control 13 to cause it to vary the output of oscillator 11 and either a saw tooth, triangular-shaped, or staircase voltage as desired.

Therefore, it is desirable to turn the control voltage generator 13 on and off depending on the setting of the control 14.

Without any limitation to the following frequency values a specific frequency plan for a preferred embodiment is as follows:

The test transmitting generator 1 produces a momentary frequency $f_m = 50$ MHz.

the joint auxiliary alternating voltage source oscillator 16 produces a constant frequency of 1.28 MHz.

The frequency divider 15 divides the incoming frequency at a rate of 160 : 1, the frequency divider 17 divides the incoming frequency at a rate of 100 : 1, therefore the frequency of $U_{h1}$ is: $f_{h1} = 8$ kHz and the frequency of $U_{h2}$ is: $f_{h2} = 12.8$ kHz Modulator 4 produces (among other frequencies) a first lower side band frequency of 49,992 MHz (49,992 MHz = 50 MHz − 8 kHz).

Modulator 6 produces (among other frequencies) a first upper side band frequency of 50.0128 MHz (50.0128 MHz = 50 MHz + 12.8 kHz).

The specified side band frequencies are supplied via terminal 7 to converter 9, the superposition frequency $f_u$ of which is always adjusted (manually or automatically) to a value which is larger than $f_m$ by a constant amount of 100 kHz:

$$f_u = f_m + 100 \text{ kHz}$$

$f_u = 50.1$ MHz (momentary value)

Among other frequencies the specified side band frequencies are converted in 9 to the I. F. range by the superposition frequency $f_u$ as follows:

50.1 MHz − 49.992 MHz = 108 kHz (= converted first lower side band frequency)

50.1 MHz − 50.0128 MHz = 87.2 kHz (= converted first upper side band frequency)

The I. F. band pass range of the converter stage 9 is chosen to be $100 \pm 12.8$ kHz.

The band pass filter 20 having a band pass range of $108 \pm 0.5$ kHz selects from the output of 18 the first lower side band frequency of modulator 4 converted to the I. F. range of 108 kHz.

The band pass filter 21 having a band pass range of $87.2 \pm 0.5$ kHz selects from the output of 18 the first upper side band frequency of modulator 6 converted to the I.F. range of 87.2 kHz.

The injection frequency $f_{u32}$ of converter 32 is derived from $U_{h1}$ and $U_{h2}$ by adding their frequencies $f_{h1}$ and $f_{h2}$ to one another:

$$f_{u32} = 20.8 \text{ kHz} = f_{h1} = f_{h2}$$

The output frequency of the band pass filter 21 is converted in 32 to a frequency of 108 kHz, which is the same as the output frequency of 20:

$$108 \text{ kHz} = 87.2 \text{ kHz} + f_{u32}$$

By sweeping $f_m$ periodically within a frequency range of 1 MHz to 100 MHz and sweeping $f_u$ within a range of 1.1 MHz to 100.1 MHz at the same time so as to keep these two frequencies at a constant frequency difference at all times, all of the frequency values on the output side of converter 9 will be kept constant, their values being as indicated above for a momentary value of $f_m = 50$ MHz.

It is an essential advantage of the present invention in that it compensates for intrinsic faults even if these faults vary with time in all operational states whether synchronized or non-synchronized and still maintains full operability during fast frequency changes of the measuring voltages.

I claim:

1. A frequency-selective attenuation testing and measuring apparatus for use in wobble operation wherein a test oscillator feeds a variable frequency signal to a test object, and a test receiver which can be tuned and synchronized with the measuring frequency, and an evaluation means receiving the output of said test receiver and producing an attenuation versus frequency presentation comprising, an adder, a first modulator and said test object connected in series between said adder and the test oscillator, a second modulator connected between said adder and the test oscillator, the transmission properties of said first and second modulators being substantially the same, a pair of auxiliary alternating voltage sources supplying voltages ($U_{h1}$ and $U_{h2}$) to said first and second modulators of such frequencies that different frequency outputs are obtained, an intermediate frequency stage receiving the output of said adder, a first band pass filter connected to said intermediate frequency stage and passing one of the side-band frequencies of said first modulator in the I.F. range to said evaluation means, a second band pass filter connected to said intermediate frequency stage and passing one of the side band frequencies of said second modulator in the I. F. range, an amplitude comparing circuit receiving the output voltage of said second filter to compare it with the output of a reference voltage generator and a variable gain amplifier connected ahead of said first and second band pass filters and receiving an input from said comparing circuit.

2. A frequency-selective attenuation testing and measuring apparatus according to claim 1, wherein the output voltage of said second band pass filter is converted to the frequency of the output voltage of said first band pass filter by frequency converting means, said evaluation means receiving the output of said frequency converting means as a reference signal used jointly with the output voltage of said first band pass filter for obtaining transmission characteristics of said test object such as the vector diagram and its real and imaginary components as a function of frequency, and for determining the phase shift properties with a phase-measuring system, or serving for level-difference measurements.

3. A frequency-selective attenuation testing and measuring apparatus according to claim 1 wherein said pair of auxiliary alternating voltage sources comprises a joint auxiliary alternating voltage source oscillator, and a pair of frequency dividers which receive the output of said joint alternating voltage source oscillator, the outputs of said frequency dividers being connected to said first and second modulators.

4. A frequency-selective attenuation testing and measuring apparatus according to claim 2, wherein said frequency converting means receives an input derived from said pair of auxiliary alternating voltage sources.

5. A frequency-selective attenuation testing and measuring apparatus according to claim 1 wherein said variable gain amplifier influences the amplitude of said variable frequency signal supplied to said test object.

6. A frequency-selective attenuation testing and measuring apparatus to claim 1 including a calibration oscillator connectible to said test receiver to calibrate it by adjusting the amplitude of the output of said reference voltage generator such that when a defined calibration voltage ($U_e$) is supplied by said calibration oscillator the output of said comparing circuit is as desired.

7. A frequency selective attenuation testing and measuring apparatus according to claim 1 wherein portions of said test transmitter and said test object are mounted in a separate plug-in unit and portions of said test receiver are mounted in a second plug-in unit.

8. A testing and measuring apparatus comprising a variable frequency test generator, a first modulator connected in series with a test object and the output of said test generator supplied thereto, a second modulator receiving an output of said test generator, auxiliary oscillator means connected to said first and second modulators and supplying different frequency inputs thereto, a frequency converter receiving the outputs of said first and second modulators and passing an I. F. frequency signal, a variable gain amplifier receiving the output of said frequency converter, a first band pass filter connected to the output of said variable gain amplifier and having a pass band to pass one of the sideband frequencies of said first modulator converted to the I.F. range, a second pass band filter connected to the output of said variable gain amplifier and having a pass band to pass one of the side band frequencies of said second modulator converted to the I. F. range, a reference voltage source, a voltage comparing circuit receiving an input from said reference voltage and from said second band pass filter to produce a control voltage, and said control voltage supplied to said variable gain amplifier to control its gain.

9. A testing and measuring apparatus comprising, a variable gain and variable frequency test generator, a first modulator connected in series with a test object and the output of said test generator supplied thereto, a second modulator receiving an output of said test generator, auxiliary oscillator means connected to said first and second modulators and supplying different frequency inputs thereto, a frequency converter receiving the outputs of said first and second modulators and passing an I.F. frequency signal, a first band pass filter connected to an I. F. output terminal and having a pass band to pass one of the sideband frequencies of said first modulator, converted to the I. F. range, a second pass band filter connected to said I. F. output terminal and having a pass band to pass one of the sideband frequencies of said second modulator converted to the I. F. range, a reference voltage source, a voltage comparing circuit receiving an input from said reference voltage source and said second band pass filter to produce a control voltage, and said control voltage supplied to said variable gain test generator to control its gain.

* * * * *